(12) United States Patent
Kurata et al.

(10) Patent No.: US 7,887,099 B2
(45) Date of Patent: Feb. 15, 2011

(54) COMPOUND TUBE AND METHOD OF PRODUCING THE SAME

(75) Inventors: Shun Kurata, Kariya (JP); Hiroki Naganawa, Nishio (JP); Fumiaki Nakamura, Kariya (JP); Kinji Ochiai, Kasugai (JP); Hiroki Ohara, Takahama (JP)

(73) Assignees: DENSO Corporation, Kariya (JP); DENSO Airs Corporation, Anjo (JP)

( * ) Notice: Subject to any disclaimer, the term of this patent is extended or adjusted under 35 U.S.C. 154(b) by 936 days.

(21) Appl. No.: 11/634,024

(22) Filed: Dec. 5, 2006

(65) Prior Publication Data
US 2008/0030023 A1 Feb. 7, 2008

(30) Foreign Application Priority Data
Dec. 6, 2005 (JP) .............................. 2005-352665

(51) Int. Cl.
*F16L 13/02* (2006.01)
(52) U.S. Cl. .............. 285/123.3; 285/288.6; 285/289.3; 29/890.036
(58) Field of Classification Search ............. 285/123.3, 285/123.13, 382, 288.6, 288.5, 289.3, 289.2; 165/154, 155; 29/890.036
See application file for complete search history.

(56) References Cited

U.S. PATENT DOCUMENTS

| | | | | |
|---|---|---|---|---|
| 1,703,037 | A * | 2/1929 | Heck ........................... | 228/136 |
| 1,877,433 | A * | 9/1932 | Brook ........................ | 285/289.2 |
| 1,886,275 | A * | 11/1932 | Bernhardt ................ | 285/288.6 |
| 1,933,915 | A * | 11/1933 | Lindquist et al. ......... | 285/289.3 |
| 2,504,625 | A * | 4/1950 | Barnhart et al. .......... | 285/289.3 |
| 3,001,767 | A * | 9/1961 | Straubing ................... | 165/154 |
| 3,339,260 | A * | 9/1967 | Burne et al. ........... | 29/890.036 |
| 4,306,617 | A * | 12/1981 | Lancaster ................... | 165/154 |
| 4,396,213 | A * | 8/1983 | Hawkins .................. | 285/289.3 |
| 4,887,853 | A * | 12/1989 | Flowers et al. ........... | 285/288.1 |
| 4,936,113 | A * | 6/1990 | Nivens ........................ | 62/513 |
| 5,333,918 | A * | 8/1994 | Crout et al. .............. | 285/288.1 |
| 5,718,131 | A | 2/1998 | Bobbitt, III | |
| 5,732,769 | A * | 3/1998 | Staffa ......................... | 165/154 |
| 5,937,500 | A | 8/1999 | Bobbitt, III | |
| 6,866,090 | B2 * | 3/2005 | Takamatsu et al. ............ | 165/41 |
| 7,021,670 | B2 * | 4/2006 | Takasaki et al. .......... | 285/124.1 |
| 7,086,668 | B2 * | 8/2006 | Takasaki et al. .......... | 285/123.3 |
| 7,089,760 | B2 | 8/2006 | Ichimura et al. | |

(Continued)

FOREIGN PATENT DOCUMENTS

DE 32 11 441 9/1983

(Continued)

OTHER PUBLICATIONS

Office Action dated Apr. 24, 2009 in Chinese Application No. 2006 1016 4738.7.

(Continued)

*Primary Examiner*—David E Bochna
(74) *Attorney, Agent, or Firm*—Harness, Dickey & Pierce, PLC (57) ABSTRACT

A compound tube is disclosed that includes an outer tube and an inner tube disposed in the outer tube. A passage is defined between the outer tube and the inner tube. Various methods of joining the outer tube to the inner tube are disclosed.

8 Claims, 6 Drawing Sheets

U.S. PATENT DOCUMENTS

| | | | |
|---|---|---|---|
| 7,229,103 B2 * | 6/2007 | Igami | 285/211 |
| 7,481,350 B1 * | 1/2009 | Shah | 228/169 |
| 2004/0169369 A1 | 9/2004 | Takamatsu et al. | |
| 2006/0096314 A1 | 5/2006 | Nakamura et al. | |
| 2006/0096744 A1 | 5/2006 | Nakamura et al. | |
| 2006/0112556 A1 | 6/2006 | Nakamura et al. | |

FOREIGN PATENT DOCUMENTS

| | | | |
|---|---|---|---|
| DE | 43 04 717 | | 6/1994 |
| DE | 20022757 | * | 12/2001 |
| GB | 2 117 281 | | 10/1983 |
| JP | 10-096598 | | 4/1998 |
| JP | 3057162 | | 12/1998 |
| JP | 2002-013882 | | 1/2002 |
| JP | 2002-318015 | | 10/2002 |
| JP | 2002-318083 | | 10/2002 |
| JP | 2003-329376 | | 11/2003 |

OTHER PUBLICATIONS

Office Action dated Jul. 10, 2008 in Korean Application No. 10-2006-0122331 with English translation.

Office Action dated Aug. 1, 2008 in Chinese Application No. 2006 1016 4738.7 with English translation.

Office Action dated Oct. 19, 2007 in Korean Application No. 10-2006-0122331 with English translation.

Office Action dated Dec. 9, 2008 in Korean Application No. 10-2006-0122331 with English translation.

Office Action dated May 25, 2010 in German Application No. 102006057312.9.

* cited by examiner

FIG. 11

COMPOUND TUBE AND METHOD OF PRODUCING THE SAME

CROSS REFERENCE TO RELATED APPLICATION

This application is based on Japanese Patent Application No. 2005-352665 filed on Dec. 6, 2005, the disclosure of which is incorporated herein by reference in its entirety.

BACKGROUND

1. Field

The present invention relates to a compound tube and a method of producing the same. For example, the compound tube includes an inner tube and an outer tube. A passage is formed inside of the inner tube, and another passage is formed between the inner tube and the outer tube.

2. Description of Related Art

Japanese Patent Publication No. A-2002-318015 discloses a refrigerant-reheating tube as a compound tube, in which an inner tube is inserted into an outer tube. Ends of the outer tube are coupled to an external surface of the inner tube. In the compound tube, either one of high-temperature refrigerant and low-temperature refrigerant flows in the inner tube, and the other refrigerant flows between the inner tube and the outer tube. Thus, heat is exchanged between the high-temperature refrigerant and the low-temperature refrigerant.

However, a specific method of coupling the inner tube and the outer tube is not described in Japanese Patent Publication No. A-2002-318015. Thus, an accurate and reliable method of coupling the inner tube and the outer tube is needed to thereby reduce leakage of the refrigerants and to improve manufacturability.

SUMMARY OF THE INVENTION

A compound tube is disclosed that includes an outer tube including an end portion and a swage portion on the end portion. The compound tube also includes an inner tube disposed in the outer tube. The end portion of the outer tube is brazed to an external face of the inner tube, and the swage portion is contracted toward the inner tube.

A compound tube is also disclosed that includes an outer tube including an end portion and a taper portion on an inner surface of the end portion. The compound tube also includes an inner tube disposed in the outer tube. The end portion of the outer tube is brazed to an external surface of the inner tube, and the taper portion becomes thinner toward an edge of the end portion.

Furthermore, a compound tube is disclosed that includes an outer tube including an end portion. The compound tube also includes an inner tube disposed in the outer tube. Moreover, the compound tube includes a connecting member disposed between the end portion of the outer tube and an external face of the inner tube. The outer tube and the inner tube are brazed to the connecting member.

Moreover, a method of producing a compound tube is disclosed that includes inserting an inner tube into an outer tube and swaging an end portion of the outer tube so as to contract the outer tube toward the inner tube. The method also includes brazing the end portion of the outer tube to an external surface of the inner tube.

Additionally, a method of producing a compound tube is disclosed that includes forming a taper portion on an inner surface of an end portion of an outer tube in a longitudinal direction such that the taper portion becomes thinner toward an edge of the end portion. The method also includes inserting an inner tube into the outer tube and brazing the end portion of the outer tube to an external surface of the inner tube by supplying a brazing material into a taper clearance between the outer tube and the inner tube formed by the taper portion.

Still further, a method of producing a compound tube is disclosed that includes inserting an inner tube into an outer tube and brazing the outer tube and the inner tube to a connecting member disposed between an end portion of the outer tube and an external face of the inner tube.

BRIEF DESCRIPTION OF THE DRAWINGS

The above and other objects, features and advantages will become more apparent from the following detailed description made with reference to the accompanying drawings. In the drawings.

DETAILED DESCRIPTION

First Embodiment

A compound tube 160 in a first embodiment is used in a refrigeration cycle device 100B of an air-conditioning apparatus 100 for a vehicle (hereinafter referred to as air-conditioning apparatus). A specific structure for the compound tube 160 will be described with reference to FIGS. 1-4.

Figure 1:
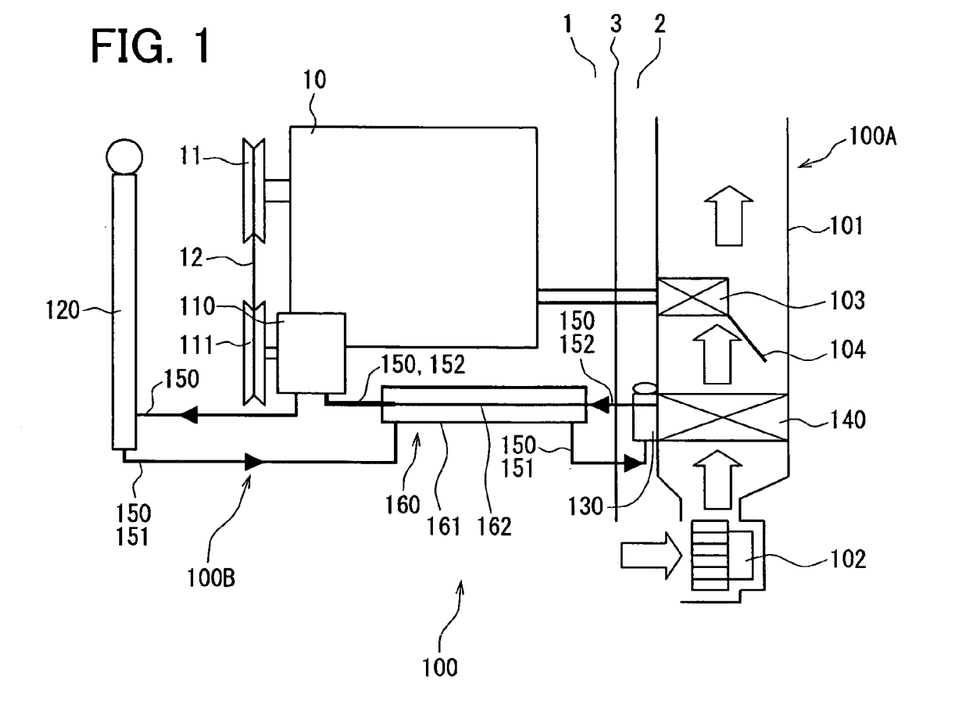
FIG. 1 is a schematic diagram showing an air-conditioning apparatus for a vehicle.

As shown in FIG. 1, an automobile is separated into an engine compartment 1 for an engine 10 and a vehicle compartment 2 for occupants by a dash panel 3. An interior unit 100A is disposed in an instrument panel in the vehicle compartment 2, and the refrigeration cycle device 100B (except for an expansion valve 130 and an evaporator 140) is disposed in the engine compartment 1. The air-conditioning apparatus 100 is constructed with the interior unit 100A and the refrigeration cycle device 100B.

The interior unit 100A includes a blower 102, evaporator 140 and a heater core 103 in an air-conditioning case 101. The blower 102 selectively sucks an outside air or an inside air of the automobile as air-conditioning air, and sends the air-conditioning air to the evaporator 140 and the heater core 103. The evaporator 140 evaporates refrigerant, when the refrigeration cycle device 100B operates. The operation will be described below. The evaporator 140 is a heat exchanger for cooling the air-conditioning air by a latent heat of the evaporation. The heater core 103 is a heat exchanger for heating the air-conditioning air by using hot water from the engine 10 as a heating source.

In addition, an air mixing door 104 is disposed adjacent to the heater core 103 in the air-conditioning case 101. When the position of the door 104 changes, the door 104 adjusts a mixing ratio of air cooled by the evaporator 140 and air heated by the heater core 103. Thus, the mixed conditioned air has a predetermined temperature set by the occupants.

Pipes 150 connect a compressor 110, a condenser 120, the expansion valve 130 and the evaporator 140 in this order in the refrigeration cycle device 100B, and form a closed cycle. The compound tube 160 is disposed between the pipes 150.

The compressor 110 compresses refrigerant to have a high-temperature and a high-pressure in the refrigeration cycle device 100B and is driven by the engine 10. That is, a pulley 111 is fixed to a driving axis of the compressor 110, and a driving force by the engine 10 is transmitted to the pulley 111 through a crank pulley 11 and a driving belt 12. In addition, an electromagnetic clutch (not shown) is disposed between the driving axis and the pulley 111.

The condenser 120 is connected to a discharging side of the compressor 110. The condenser 120 is a heat exchanger for condensing refrigerant to a liquid phase by exchanging heat with outside air, and operates as a radiator or a gas cooler.

The expansion valve 130 is a decompressor for decompressing the liquid phase refrigerant discharged from the condenser 120 to be expanded. A throttle, a valve or an ejector may be used as the expansion valve 130. The expansion valve 130 is disposed adjacent to the evaporator 140 in the interior unit 100A. The expansion valve 130 thermally controls its opening degree such that refrigerant flowing from the evaporator 140, i.e., refrigerant sucked by the compressor 110, has a predetermined superheat degree. For example, the predetermined superheat degree is equal to or less than 5° C. Alternatively, the predetermined superheat degree is in a range between 0° C. and 3° C. such that the refrigerant flowing from the evaporator is hardly superheated.

The evaporator 140 is a low-pressure side heat exchanger for cooling the air-conditioning air, as described above. The evaporator 140 operates as a cooling unit or a heat absorber. A refrigerant outlet side of the evaporator 140 is connected to a refrigerant suction side of the compressor 110.

The pipes 150 include a high-pressure pipe 151 for flowing a high-temperature and high-pressure refrigerant, and a low-pressure pipe 152 for flowing a low-temperature and low-pressure refrigerant. The high-pressure pipe 151 extends from the compressor 110 through the condenser 120 to the expansion valve 130, and the low-pressure pipe 152 extends from the evaporator 140 to the compressor 110. The compound tube 160 has a compound tube structure. The compound tube 160 is included for providing fluid communication for at least a part of the pipes 150 and operates as a refrigerant pipe for the air-conditioning apparatus.

Figure 2:
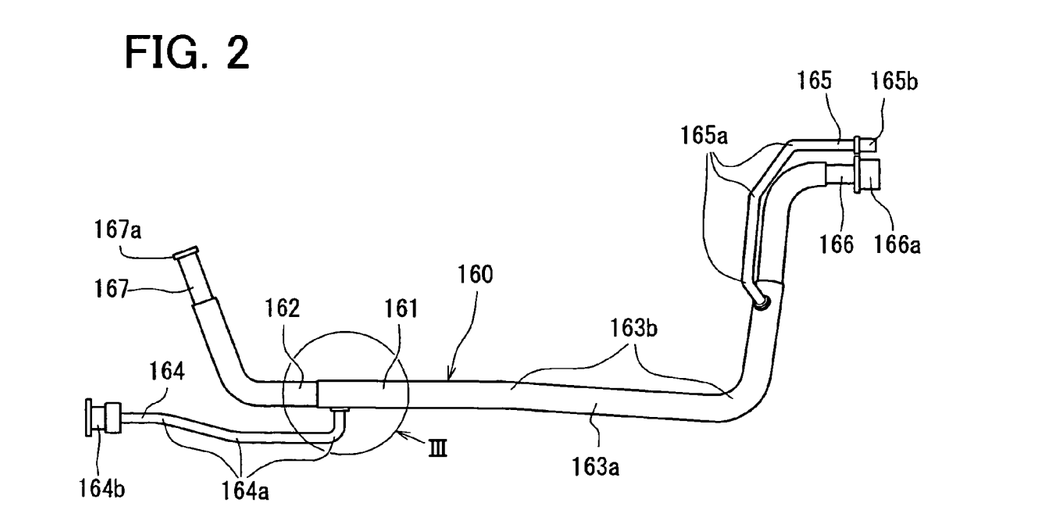
FIG. 2 is a side view showing a compound tube according to a first embodiment.

In one embodiment, the compound tube 160 has a total length of 700-900 mm. The compound tube 160 includes a straight portion 163a and plural bending portions 163b in order to fit amongst other devices, e.g., engine 10, or a vehicle body. The compound tube 160 is positioned in the engine compartment 1.

Figure 3:
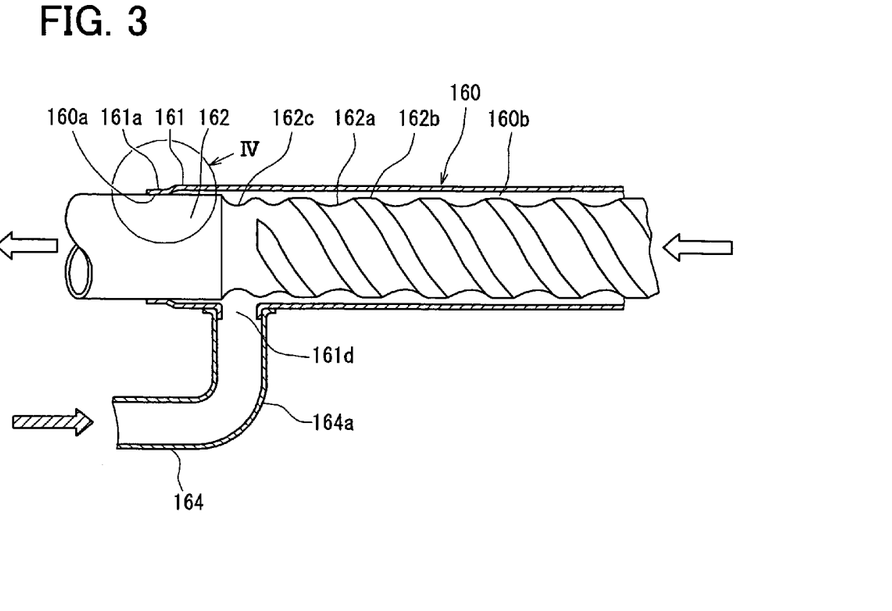
FIG. 3 is a cross-sectional view showing the part of the compound tube indicated at III in FIG. 2.

The compound tube 160 includes an outer tube 161 and an inner tube 162, which are respectively formed. The inner tube 162 passes through an inside of the outer tube 161. In one embodiment, the outer tube 161 is a ϕ22 mm-tube (external diameter: 22 mm, internal diameter: 19.6 mm) and made of aluminum, for example. An entire periphery of an end portion 161a of the outer tube 161 in a longitudinal direction is contracted, after the inner tube 162 is inserted into the outer tube 161. Then, the entire periphery of the end portion 161a is brazed to an external surface of the inner tube 162 (external diameter: 19.1 mm) air-tightly and liquid-tightly so as to form a brazed junction 160a. Thus, a passage, i.e., space, 160b is formed between an internal surface of the outer tube 161 and an external surface of the inner tube 162.

The outer tube 161 adjacent to each end portion 161a includes an aperture 161d for communicating the passage 160b to an outside. The aperture 161d is disposed at a predetermined distance from the respective edge of the end portion 161a of the outer tube 161. Each aperture 161d includes a flange that extends outward from the outer tube 161. Each one of the aluminum liquid pipes 164, 165 is coupled to one of the flanges of the apertures 161d. For instance, in one embodiment, each of aluminum liquid pipes 164, 165 of the high-pressure pipe 151 is brazed to the one of the apertures 161d.

Each of the liquid pipes 164, 165 has plural (three in this embodiment) bending portions 164a, 165a and a joint part 164b, 165b at its end. The liquid pipe 164 extends toward the condenser 120, and the liquid pipe 165 extends toward the expansion valve 130. The joint part 164b is connected to the outlet of the condenser 120, and the joint part 165b is connected to the inlet of the expansion valve 130, such that high-pressure refrigerant flows in the liquid pipe 164, then the passage 160b, and then the liquid pipe 165 as represented by the crosshatched arrow in FIG. 3.

In contrast, in one embodiment, the inner tube 162 is a ¾ inch-tube (external diameter: 19.1 mm, internal diameter: 16.7 mm) made of aluminum, for example. It is understood that a cross-sectional area of the passage 160b is predetermined in order to allow a desired flow of the high-pressure refrigerant therethrough, and yet the external surface area of the inner tube 162 is sufficient to allow for desired heat exchange by providing the external diameter of the inner tube 162 close to the outer tube 161.

The aluminum suction pipes 166, 167 of the low-pressure pipe 152 are provided at opposite ends of the inner tube 162 in the longitudinal direction. The suction pipe 166 corresponds to the liquid pipe 165, and the suction pipe 167 corresponds to the liquid pipe 164. Each of the suction pipes 166, 167 has a joint part 166a, 167a at its end. The joint part 166a is connected to the outlet of the evaporator 140, and the joint part 167a is connected to the inlet of the compressor 110, such that low-pressure refrigerant flows in the suction pipe 166, then the inner tube 162, and then the suction pipe 167 as represented by the hollow arrows in FIG. 3.

As shown in FIG. 3, a round groove 162c and a helical groove 162a are formed on the external face of the inner tube 162, to increase volume of the passage 160b. The round groove 162c is provided adjacent the junction between the liquid pipe 164, 165 and the outer tube 161, and extends in a circumferential direction of the inner tube 162. The helical groove 162a is connected to the round grooves 162c, and has multiple (three in this embodiment) threads helically extending in a longitudinal direction of the inner tube 162 between the round grooves 162c. A peak portion 162b is formed between the spiral grooves 162a, and an external dimension of the peak portion 162b is approximately equal to an external dimension of the inner tube 162. The passage 160b is enlarged by the grooves 162c, 162a.

Figure 4:
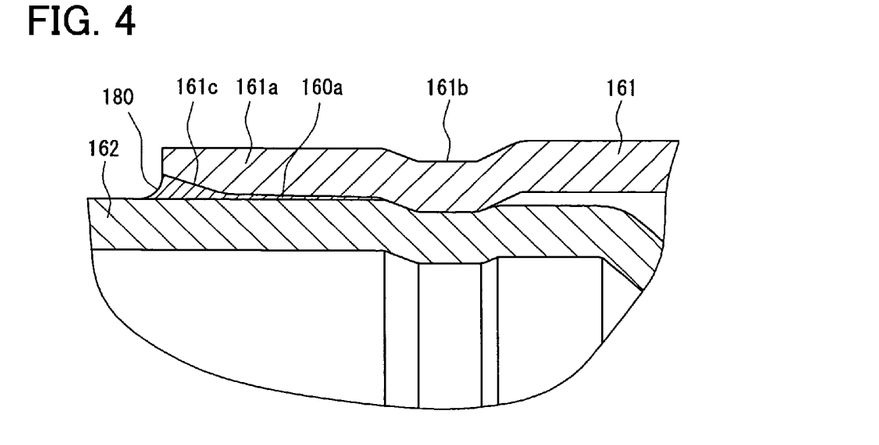
FIG. 4 is an enlarged cross-sectional view showing the junction indicated at IV in FIG. 3.

As shown in FIG. 4, the outer tube 161 includes a taper portion 161c and a swage portion 161b around the brazed junction 160a of the compound tube 160. The taper portion 161c is formed on an inner face of the end portion 161a of the outer tube 161, and a clearance between the inner tube 162 and the taper portion 161c is enlarged toward the edge of the end portion 161a. That is, the end portion 161a is formed to be thinner toward the edge of the end portion 161a due to the taper portion 161c. In one embodiment, the outer tube 161 has an external diameter of 22 mm, an internal diameter of 19.6 mm and a thickness of 1.2 mm. Also, in one embodiment, an angle between the taper portion 161c and the inner tube 162 is approximately 10° to 30°, and a length of the taper portion 161c is approximately 1 mm to 2 mm. It will be appreciated that the dimensions of the taper portion 161c are appropriate for improving brazing efficiency as described below.

Figure 5:
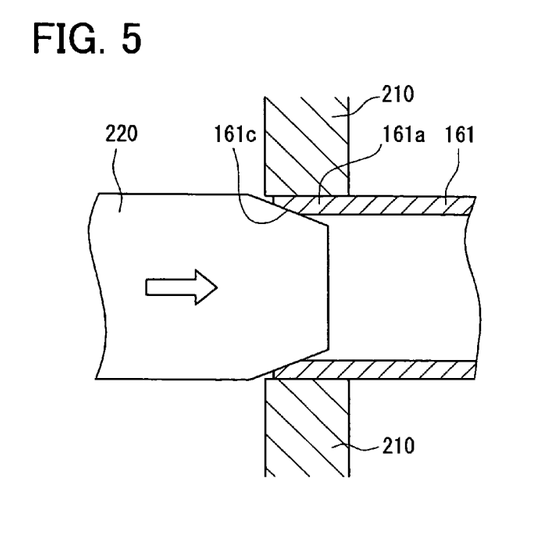
FIG. 5 is a cross-sectional view showing a pressing tool and a punch for forming a taper portion.

The taper portion 161c is formed, before the inner tube 162 is inserted into the outer tube 161. As shown in FIG. 5, a pressing tool 210 presses an external face of the end portion 161a, and a punch 220 is inserted between the end portions 161a. Because the punch 220 has a conical shape at its end, an inner face of the end portion 161a is plastically deformed so as to form the taper portion 161c on the inner face of the end portion 161a.

In contrast, the swage portion 161b is formed by pressing the outer tube 161 to the external circumferential face of the inner tube 162, after the inner tube 162 is inserted into the outer tube 161. The swage portion 161b is positioned at a side opposite to the taper portion 161c on the end portion 161a. For example, the swage portion 161b is positioned 3-7 mm apart from the edge of the outer tube 161, in order to improve the brazing efficiency to be described below.

Figure 6A:
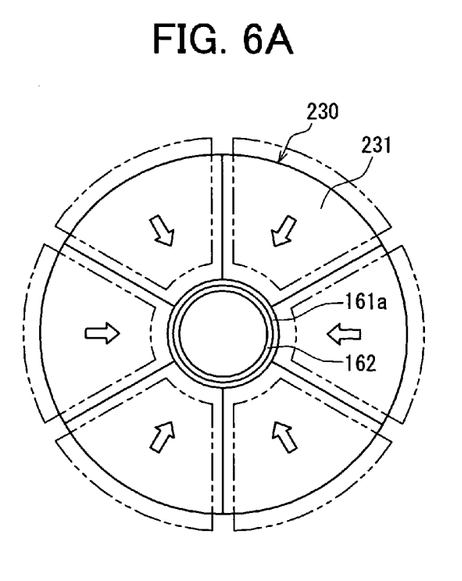
FIG. 6A is a front view showing a swaging tool for forming a swage portion.
Figure 6B:
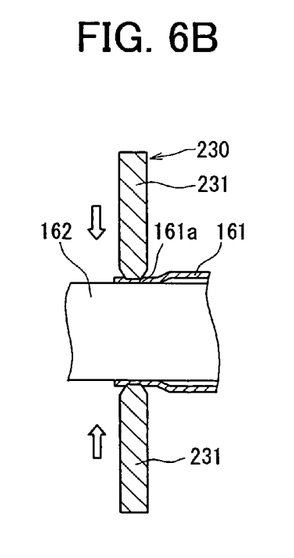
FIG. 6B is a cross-sectional view showing the swaging tool.

As shown in FIGS. 6A and 6B, the swage portion 161b is formed by a swaging tool 230 including plural divided parts 231. The swaging tool 230 has a round shape, and an aperture for the outer tube 161 is formed at a center part of the swaging tool 230. The divided parts 231 can slide in a radial direction as represented by the arrows in FIGS. 6A and 6B. After the divided parts 231 slide toward a center, the divided parts 231 are in contact with each other in the circumferential direction. When the divided parts 231 are moved toward each other, an internal diameter of the aperture between the divided parts 231 is smaller than an external diameter of the outer tube 161 by a predetermined swage dimension. Edges of the divided parts 231 to be in contact with the outer tube 161 have a wedge or semicircular shape such that a thickness of the divided parts 231 becomes thinner toward the edges. After each of the divided parts 231 slides radially toward the outer tube 161, the end portion 161a is disposed so as to be surrounded by the divided parts 231. At this time, the Inner tube 162 is already inserted into the outer tube 161. Then, each of the divided parts 231 slides toward a center side. Thus, the swage portion 161b can be formed.

Each of the divided parts 231 has a fan shape, and the aperture for the outer tube 161 is formed into an approximately round shape by the divided parts 231. In this embodiment, the swaging tool 230 has six divided parts 231. Alternatively, the swaging tool 230 may have three, four or eight divided parts 231. Although the swaging tool 230 contracts the outer tube 161, a cross-sectional shape of the outer tube 161 can be kept to be round. Wrinkles and protrusions may be slightly formed around the swage portion 161b by the swaging tool 230.

At the swage portion 161b, the outer tube 161 is contracted toward the inner tube 162. In one embodiment, at the swage portion 161b, the internal diameter of the outer tube 161 and the external diameter of the inner tube 162 are made to be approximately equal to each other. Thus, the outer tube 161 and the inner tube 162 are in contact with each other. In this embodiment, in order to make a reliable connection between the outer tube 161 and the inner tube 162, the internal diameter of the outer tube 161 is made to be slightly smaller than the external diameter of the inner tube 162. That is, the outer tube 161 slightly presses into the inner tube 162. Therefore, as shown in FIG. 4, the inner tube 162 is contracted at the swage portion 161b, similarly to the outer tube 161. A depth of the contraction part of the inner tube 162 is smaller than the thickness of the inner tube 162. A groove having a trapezoidal shape in its cross-section is formed on an entire circumferential face of the outer tube 161 corresponding to the swage portion 161b. Even if the end portion 161a of the outer tube 161 is slightly contracted during the forming of the swage portion 161b, a brazing material is provided via a clearance between the outer tube 161 and the inner tube 162 due to the taper portion 161c.

Figure 7:
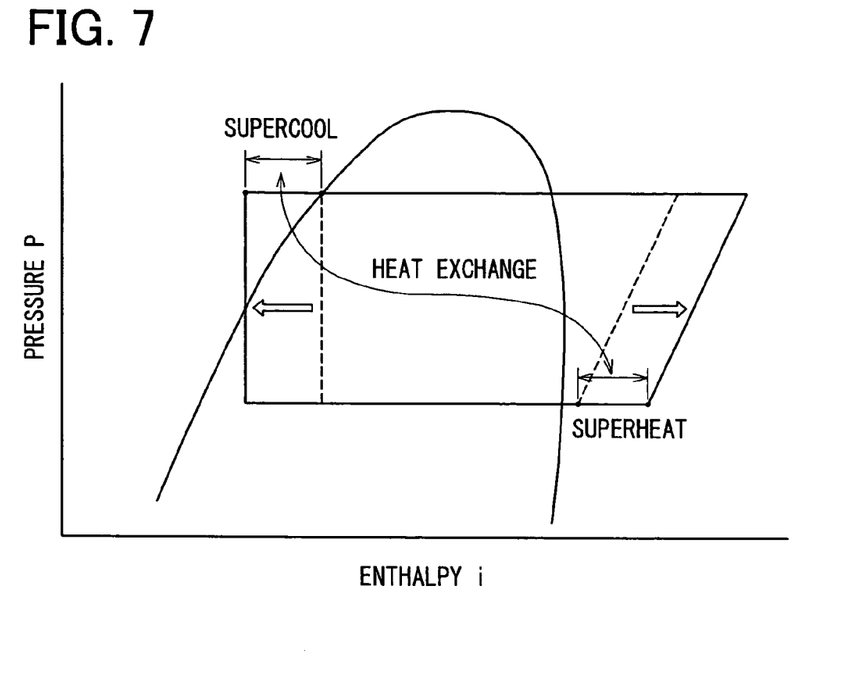
FIG. 7 is a graph showing a Mollier diagram for a refrigeration cycle device.

Next, an operation based on the above structure and an advantage of the operation will be described with reference to a Mollier diagram shown in FIG. 7.

When an occupant of the automobile requires an air-conditioning for cooling, the electromagnetic clutch of the compressor 110 is connected. The compressor 110 is driven by the engine 10, and sucks and compresses refrigerant flowing from the evaporator 140. Thereafter, the refrigerant is discharged from the compressor 110 to the condenser 120 as a high-temperature and high-pressure refrigerant. The high-pressure refrigerant is cooled in the condenser 120 to a liquid phase. The liquid refrigerant flows through the liquid pipe 164, the passage 160b and the liquid pipe 165, and is decompressed and expanded in the expansion valve 130. Then, the expanded refrigerant is evaporated in the evaporator 140, and made to be a saturated gas to a superheat degree of 0-3° C. Air-conditioning air is cooled in accordance with the evaporation of the refrigerant in the evaporator 140. The saturated gas-phase refrigerant flows through the suction pipe 166, the inner tube 162 and the suction pipe 167 as a low-temperature and low-pressure refrigerant, and returns to the compressor 110.

Here, the high-pressure refrigerant and the low-pressure refrigerant exchange heat in the compound tube 160. The high-pressure refrigerant is cooled, and the low-pressure refrigerant is heated. That is, the liquid refrigerant flowing from the condenser 120 is supercooled in the compound tube 160 so as to be promoted to have a low-temperature. The amount of the liquid refrigerant flowing from the condenser 120 to the evaporator 140 is increased, and enthalpy in the evaporator 140 is increased. Therefore, a cooling performance of the evaporator 140 can be improved, Further, because refrigerant flowing from the evaporator 140 can have a predetermined superheat degree due to the compound tube 160, the evaporator 140 is not required to make the refrigerant to have the predetermined superheat degree. Therefore, the cooling performance of the evaporator 140 can be improved. Then, because refrigerant flowing from the evaporator 140 is made to be a saturated gas-phase due to the compound tube 160, a liquid compression in the compressor 110 can be reduced. In addition, the low-pressure refrigerant does not receive a radiant heat from the engine 10, because the inner tube 162 for communicating the low-pressure refrigerant is covered by the outer tube 161. Thus, the cooling performance can be maintained.

According to the compound tube 160 in this embodiment, the swage portion 161b and the taper portion 161c are provided on the end portion 161a of the outer tube 161. Due to the swage portion 161b, displacements of the outer tube 161 and the inner tube 162 in the longitudinal direction can be reduced. Therefore, the outer tube 161 and the inner tube 162 can be easily brazed. Further, because a clearance between the outer tube 161 and the inner tube 162 can be made to be uniform in the entire circumferential direction, a brazing material having a bar or ring shape can be uniformly provided between the outer tube 161 and the inner tube 162. Thus, a reliable and secure brazing can be performed.

Due to the taper portion 161c, the brazing material can be easily provided in a taper clearance formed between the taper portion 161c and the inner tube 162. Then, a clearance between the outer tube 161 and the inner tube 162 can be filled with the brazing material, and a fillet 180 can be formed in the taper clearance, as shown in FIG. 4. Thus, the reliable and secure brazing can be performed.

Second Embodiment

Figure 8:
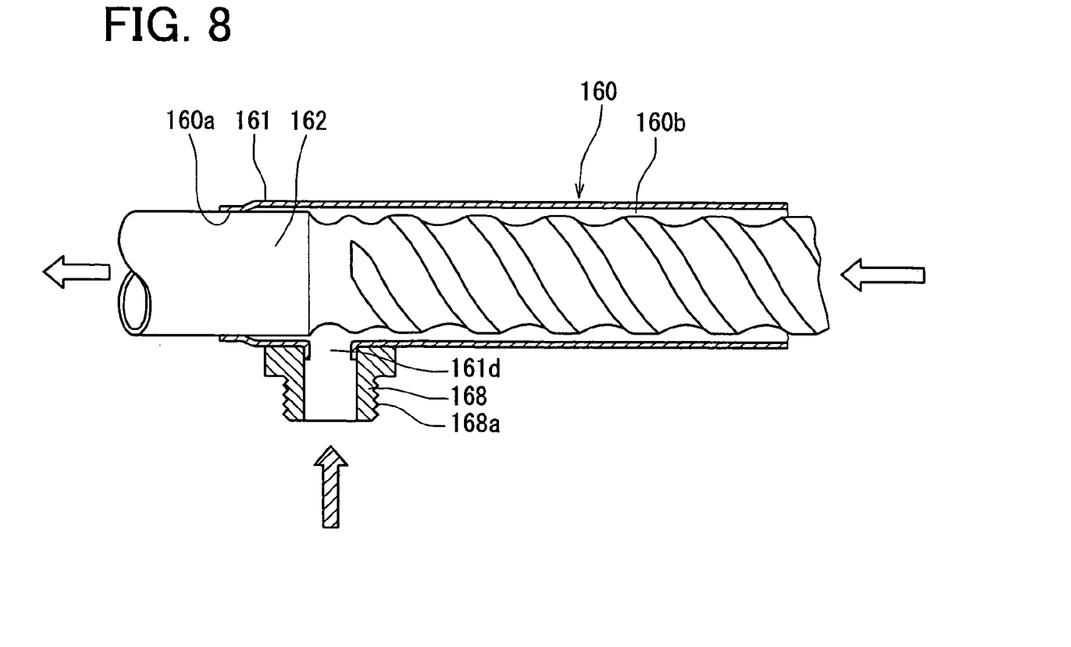
FIG. 8 is a cross-sectional view showing a compound tube according to a second embodiment.

As shown in FIG. 8, the liquid pipes 164, 165 in the first embodiment are changed to a union, e.g., joint, 168 in a second embodiment. The other parts in the second embodiment may be made similar to the first embodiment.

The union 168 has a male threaded part 168a on an external face of a tube portion, and is brazed to the flange of the aperture 161d of the outer tube 161. An inside of the tube portion of the union 168 communicates with the passage 160b.

According to the second embodiment, the compound tube 160 having the union 168 can be mechanically connected to the liquid pipes 164, 165 having a female threaded part corresponding to the male threaded part 168a, after the outer tube 161 and the inner tube 162 are brazed. The joint 168 can facilitate attachment of the liquid pipes 164, 165 and can facilitate overall manufacturability of the compound pipe 160.

Third Embodiment

Figure 9:
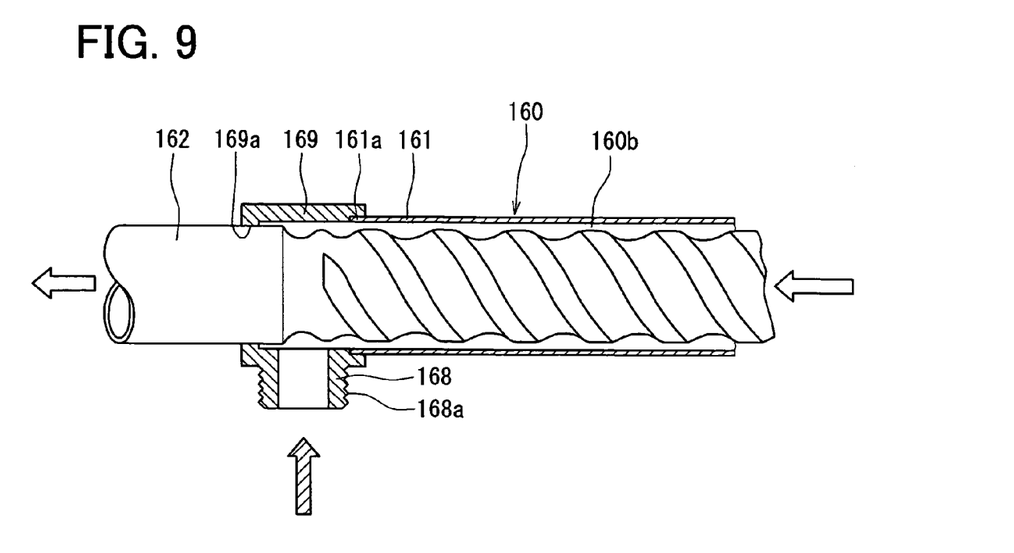
FIG. 9 is a cross-sectional view showing a compound tube according to a third embodiment.

As shown in FIG. 9, a connecting block 169 is disposed between the outer tube 161 and the inner tube 162 in a third embodiment. The other parts in the third embodiment may be made similar to the first embodiment.

In one embodiment, the connecting block 169 has a tube portion formed by cutting a block material made of aluminum. In one axial direction, one end of the tube portion is open, and the other end of the tube portion is closed so as to form a base. An aperture 169a for inserting the inner tube 162 is formed in a center part of the base. Then, an internal face of the aperture 169a and an external face of the inner tube 162 are brazed. Further, the end portion 161a of the outer tube 161 is inserted into the open end of the connecting block 169, and the open end of the connecting block 169 and the end portion 161a are brazed.

Furthermore, the threaded union 168 is integrally formed on a side wall of the connecting block 169. An inside of the tube portion of the union 168 communicates with the passage 160b.

According to the third embodiment, a clearance between the outer tube 161 and the inner tube 162 can be accurately determined by the open end of the connecting block 169 and the aperture 169a. Thus, the outer tube 161 and the inner tube 162 can be easily and reliably brazed.

Further, because the union 168 is integrally formed with the connecting block 169, the union 168 can be produced at a reduced price, and the same advantage can be provided as the second embodiment.

Fourth Embodiment

Figure 10:
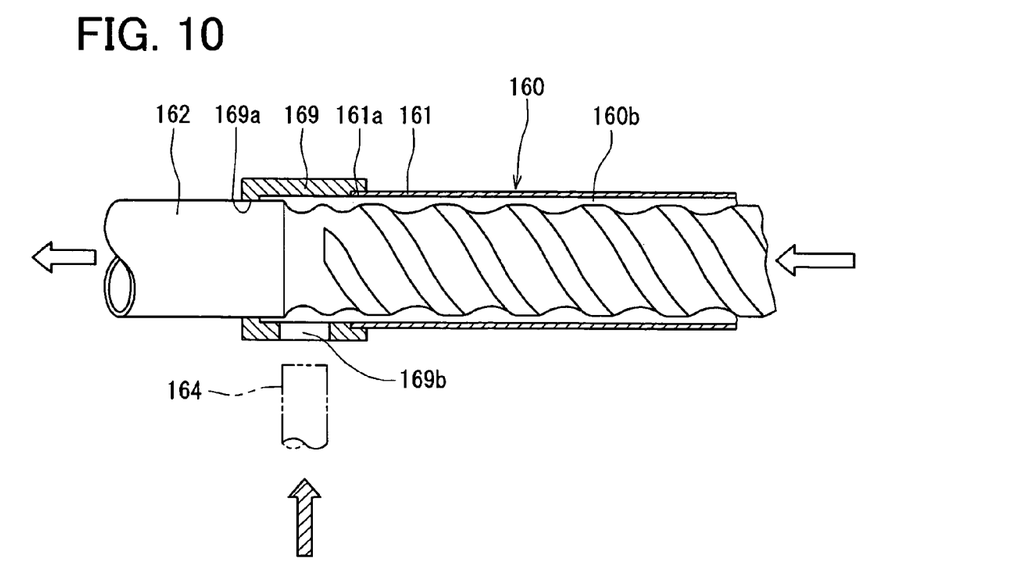
FIG. 10 is a cross-sectional view showing a compound tube according to a fourth embodiment.

As shown in FIG. 10, the union 168 in the third embodiment is changed to an aperture 169b for inserting the liquid pipe 164, 165 in a fourth embodiment. The aperture 169b is provided on the side wall of the connecting block 169.

According to the fourth embodiment, the liquid pipe 164, 165 can be brazed to the aperture 169b, after the outer tube 161 and the inner tube 162 are brazed. As such, manufacturability of the double pipe 160 can be improved.

Fifth Embodiment

Figure 11:
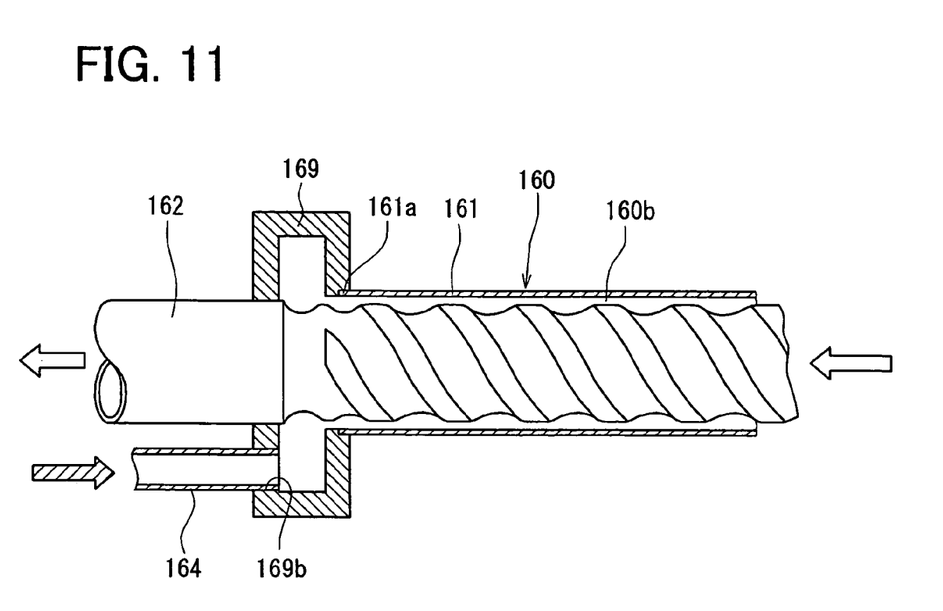
FIG. 11 is a cross-sectional view showing a compound tube according to a fifth embodiment.

As shown in FIG. 11, the aperture 169b for inserting the liquid pipe 164, 165 is provided in the base of the connecting block 169, and the liquid pipe 164, 165 is brazed to the aperture 169b so as to extend in a longitudinal direction of the inner tube 162 in a fifth embodiment.

When the liquid pipe 164, 165 is disposed in parallel to the inner tube 162, bending of the liquid tubes 164, 165 can be avoided. Further, because space for the bending portions is unnecessary, the compound tube 160 can be disposed in a narrow space.

Other Embodiments

Although the present invention has been fully described in connection with the preferred embodiments thereof with reference to the accompanying drawings, it is to be noted that various changes and modifications will become apparent to those skilled in the art.

The above-described structures can be used for at least one end of the outer tube and the inner tube. The other end may have a conventional structure.

Further, the refrigeration cycle device 100B is used for the air-conditioning apparatus 100 for a vehicle. Alternatively, the device 100B may be used for a home air-conditioning apparatus. In this case, an outside air of the outer tube 161 may be lower compared with air within the engine compartment 1. Therefore, a low-pressure refrigerant may flow in the passage 160b, and a high-pressure refrigerant may flow in the inner tube 162, based on a heat-exchanging performance between the high-pressure refrigerant and the low-pressure refrigerant.

Further, the compound tube 160 may be used for any suitable device other than an air conditioning apparatus, such as an internal heat exchanger for a refrigeration cycle. For example, the compound tube 160 may be used for an internal heat exchanger for a refrigeration cycle including carbon dioxide as refrigerant.

Further, fluid flowing in the compound tube 160 may not be limited to refrigerant for the refrigeration cycle device 100B. The fluid may be of any suitable type. Also, refrigerant having a different physical property may be selected. For example, a combination of refrigerants can be used, in which flowing directions, temperatures and pressures of the refrigerants are different.

Further, the liquid pipes 164, 165 may be straight. Moreover, the liquid pipes 164, 165 are made of aluminum. Alternatively, the liquid pipes 164, 165 may be made of any suitable material, such as iron or copper. Also, the inner and outer tubes 161, 162 can be made out of any suitable material.

In addition, the structure and manufacturing method may be employed for a compound tube 160 having any number of tubes.

Such changes and modifications are to be understood as being within the scope of the present invention as defined by the appended claims.

What is claimed is:

1. A compound tube comprising:
    an outer tube including an end portion and a taper portion on an inner surface of the end portion; and
    an inner tube disposed in the outer tube, wherein
    the end portion of the outer tube is brazed to an external surface of the inner tube, and
    the taper portion becomes thinner toward an edge of the end portion; wherein
    the outer tube further includes an annular swage portion adjacent to the taper portion extending entirely around the end portion; and
    the swage portion is contracted toward the inner tube.

2. The compound tube according to claim 1, further comprising:
    a joint including a threaded part for connecting an outside pipe, wherein
    the joint includes a first passage that communicates with a second passage between the outer tube and the inner tube.

3. The compound tube according to claim 1, wherein:
    the outer tube has an aperture at which an outside pipe is brazed to communicate with the aperture;
    the aperture communicates with a passage between the outer tube and the inner tube.

4. A method of producing a compound tube, the method comprising:
    forming a taper portion on an inner surface of an end portion of an outer tube in a longitudinal direction such that the taper portion becomes thinner toward an edge of the end portion;
    inserting an inner tube into the outer tube;
    forming an annular swage extending entirely around the end portion of the outer tube by contracting the outer tube toward the external face of the inner tube before the brazing; and
    brazing the end portion of the outer tube to an external surface of the inner tube by supplying a brazing material into a taper clearance between the outer tube and the inner tube formed by the taper portion.

5. The method according to claim 4, further comprising coupling an outside pipe for communication with a passage between the outer tube and the inner tube after the brazing.

6. The method according to claim 5, wherein the coupling step includes mechanically forming the outside pipe.

7. The method according to claim 5, wherein the coupling step includes brazing the outside pipe.

8. The method of claim 4 wherein the forming step reduces an outside diameter of the inner tube.

* * * * *